(12) United States Patent
Williams (10) Patent No.: US 6,317,139 B1
(45) Date of Patent: Nov. 13, 2001

(54) METHOD AND APPARATUS FOR RENDERING 3-D SURFACES FROM 2-D FILTERED SILHOUETTES

(76) Inventor: Lance Williams, 4321 Talofa Ave., Toluca Lake, CA (US) 91602

(*) Notice: Subject to any disclaimer, the term of this patent is extended or adjusted under 35 U.S.C. 154(b) by 0 days.

(21) Appl. No.: 09/047,586

(22) Filed: Mar. 25, 1998

(51) Int. Cl.[7] .................................................... G06T 11/60
(52) U.S. Cl. ......................... 345/634; 345/581; 382/266
(58) Field of Search ................................... 345/419, 421, 345/423, 424, 425, 429, 473, 474, 475, 435, 581, 629, 630, 634; 382/266, 268, 154

(56) References Cited

U.S. PATENT DOCUMENTS

| | | | |
|---|---|---|---|
| 5,544,291 | 8/1996 | Gilley et al. | 395/123 |
| 5,613,048 | 3/1997 | Chen et al. | 395/119 |

OTHER PUBLICATIONS

From Images to Models (and Beyond): a personal retrospective, Szeliski, May 21, 1997.
Constructing Implicit Shape Models from Boundary Data, Vehlo et al., May 1995.
Generating Octree Models of 3d Objects from Their Silhouettes in a . . . , Potmesil, 1987.
Geometric Clipping Using Boolean Textures, Lorenson, 1993.
Geometric Modeling for Computer Vision: Section 9–3—Object Locus Solving, Baumgart, Aug. 1974.
Introduction to Implicit Surfaces: Chapter 4—Surface Tiling, Bloomenthal, 1997.
Marching Cubes: A High Resolution 3D Surface Construction Algorithm, Lorenson, Jul. 1987.

*Primary Examiner*—Mark Zimmerman
*Assistant Examiner*—Mano Padmanabhan
(74) *Attorney, Agent, or Firm*—Hogan & Hartson, L.L.P.

(57) ABSTRACT

A gradient-based silhouette projection method for rendering the surface of a 3-D object is described herein. A set of imaging points is selected for imaging the object. The object is imaged from each of the selected imaging points to generate a set of images and a set of binary silhouettes are extracted from the images of the object, with at least one silhouette per image. The binary silhouettes are each filtered to generate an equal number of gradient silhouettes. Each of the gradient silhouettes is projected to generate a set of gradient volume projections that are combined to yield a single combined gradient volume. A 3-D isosurface is generated from the combined gradient volume, with the 3-D isosurface thereby representing the 3-D object. In one example described herein, the binary silhouettes are filtered to generate gradient silhouettes by determining tubular neighborhoods for the binary silhouettes. The gradient volume projections are represented by voxels. The 3-D isosurface is determined from the combined gradient volume by applying a marching cubes algorithm to the voxels representing the combined gradient volume. A set of polygons representing the 3-D isosurface is generated by approximately determining the set of polygons representing the locus of all lines that do not intersect the 3D isosurface. The set of polygons is subsequently textured based upon texture information provided in the set of input images or from other sources. The various steps may be repeated while the object moves or otherwise changes. A technique employing only a single initial silhouette is also described. Apparatus embodiments are also described.

25 Claims, 9 Drawing Sheets

METHOD AND APPARATUS FOR RENDERING 3-D SURFACES FROM 2-D FILTERED SILHOUETTES

BACKGROUND OF THE INVENTION

I. Field of the Invention

The invention generally relates to computer graphics and in particular to techniques for rendering 3-D surfaces.

II. Description of the Related Art

A long-standing problem in computer graphics is the rendering of surface images based upon actual 3-D objects, particularly moving objects. In particular, significant problems arise in the generation of an internal computer representation of the surface of a 3-D object. Unlike 2-D images, which can merely be scanned into a computer then stored therein using a simple pixel representation, 3-D objects cannot be easily scanned into a computer nor conveniently stored therein. The problem of generating an internal surface representation of an actual 3-D object is made significantly worse if the object is in motion or is otherwise changing shape.

One of technique that has shown some promise for rendering the surfaces of actual 3-D objects involves the extraction and subsequent volume projection of 2-D silhouettes of the object. Conceptually, the silhouette projection technique operates as follows. A 3-D object is imaged from various imaging points. A binary silhouette or matte of the object is extracted from each image. Each silhouette is then projected or extruded in three dimensions yielding a corresponding Boolean volume cylinder having a perimeter cross-section matching the perimeter of the corresponding silhouette. The cylinders are then combined in accordance with the relative locations of the imaging points yielding a set of intersecting cylinders. The intersection portions of the cylinders collectively define a 3-D surface, which approximates the 3-D object. The 3-D surface is, itself, then approximated using polygons. The polygons thus provide a 3-D surface representation of the surface of the object. The polygonal representation of the surface of the 3-D object then can be internally manipulated using the computer to, for example, generate displays of the object from any desired direction or perhaps to morph the object into other shapes. The number of polygons employed to approximate the intersecting portions of the cylinders can be increased, as desired, to approximate the intersecting portions with arbitrary accuracy. However, only an increase in the number of initial silhouettes in combination with an increase in the number of polygons can yield a more faithful representation of the original object.

To incorporate perspective into the 3-D surface representation of the object, the distance from each imaging point to the object is taken into account during the projection process. To this end, each silhouette is projected into a volume cone, rather than a cylinder, with the cone having a perimeter cross-section matching the perimeter of the corresponding silhouette. Again, a final 3-D surface representation is generated by combining the volume cones, determining the intersection of the surfaces of the cones, and generating a polyhedral representation of that surface. The aforementioned technique is described in *From images to models* (and beyond): *a personal retrospective,* by Richard Szeliske, Vision Interface 97, May 21, 1997.

A significant advantage of the silhouette projection technique is that it requires as input only simple 2-D images of the object, which may be generated by a simple video camera or similar imaging device. Unfortunately, in use, the silhouette projection technique does not yield a very faithful representation of the original object unless a very large number of initial images are taken from all sides of the object. To provide the large number of initial images, the object is typically placed on a rotating turntable adjacent to the video camera. The video camera generates an entire sequence of image frames of the object as the object slowly rotates on the turntable relative to the video camera. Each image frame is processed to extract a silhouette of the object. Accordingly, a large number of silhouettes are generated requiring a considerable amount of the processing time to generate the corresponding volume projections, to combine the projections, and to generate the polyhedral representation of intersecting surface portions of the combined projections. Thus, although the fidelity with which the object is represented improves by using a large number of input images, the required processing time is often prohibitive. Moreover, real time imaging of the object is typically completely precluded. In this regard, real-time imaging would likely require dozens or perhaps hundreds of video cameras simultaneously imaging the object from all sides to generate, at each point in time, the large number of input images required to faithfully represent the object. Additionally, vast computing power would be required to process the dozens or hundreds of images, at each point in time, to extract the corresponding silhouettes, to generate the volume projections, to combine the volume projections, and to generate a polyhedral representation of the intersection of the combined volume projections.

One of the reasons that the silhouette projection technique requires a large number of input images to generate a faithful representation of an object is that the intersection of combined volume projections of silhouettes of an object simply does not provide a very good approximation of the object. In this regard, consider the application of the silhouette projection technique to a simple sphere using three initial images, from the front, top and side of the sphere, respectively. As can be appreciated, the silhouettes extracted from the initial images are merely circles. When the circles are projected into volume projections, simple cones are generated. The intersection of three cones, however, does not produce an intersecting surface that closely corresponds to a sphere. Rather, the intersection of three cones produces a somewhat angular geometric object. Only when a large number of cones are intersected along a large number of radial directions will the resulting intersecting surface closely approximate the sphere.

Thus, even in the case of a simple sphere, which should be easy to represent because of its three dimensional symmetry, the silhouette projection technique does not yield a faithful representation unless a large number of silhouettes are processed. As can be appreciated, more complicated objects will likely require far more silhouettes than the sphere to provide even a reasonable representation of the object.

Accordingly, it would be desirable to provide an improved silhouette projection technique that requires relatively few input images yet yields a faithful representation of a 3-D object. As can be appreciated, such a technique would reduce the processing time required to generate the final surface representation of the object, thereby rendering the technique much more practical and economical. Moreover, if sufficiently few input images are required, real time rendering of a moving or otherwise changing 3-D object becomes feasible. It is to these ends, that various aspects of the present invention are directed.

SUMMARY OF THE INVENTION

In accordance with one aspect of the invention, a method for generating a graphical representation of a 3-D object using a set of silhouettes is provided. The method comprises the steps of selecting a plurality of imaging points for imaging the object; imaging the object from each of the selected imaging points to generate a plurality of images; and extracting a plurality of binary silhouettes from the images of the object, with at least one silhouette per image of the object. The binary silhouettes are each filtered to generate an equal plurality of gradient or continuous silhouettes. Each of the gradient silhouettes is projected to generate an equal plurality of gradient volume projections, which are combined to yield a single combined gradient volume. A 3-D isosurface is generated from the combined gradient volume, with the 3-D isosurface being representative of the 3-D object.

In one example, the binary silhouettes are filtered to generate gradient silhouettes by determining tubular neighborhoods for the binary silhouettes. The gradient volume projections, which may have a Gaussian density cross-section, are represented by voxels. The 3-D isosurface is determined from the combined gradient volume by applying a marching cubes algorithm to the voxels representing the combined gradient volume. A set of polygons representing the 3-D isosurface is generated by determining the set of polygons representing the locus of all lines that do not intersect the 3D isosurface. The set of polygons is subsequently textured based upon texture information provided in the plurality of input images or from other sources. The various steps may be repeated while the object moves or otherwise changes.

In many cases, a more faithful representation of a 3-D object is achieved than with the prior art technique described above, in part, because gradient silhouettes and gradient volume projections are employed, rather than binary silhouettes and Boolean volume projections. Consider again the example of the simple sphere imaged from three directions. As described above, when employing the conventional silhouette projection technique, the intersection of the conical volume projections of the circular silhouettes does not correspond closely to a sphere. However, when the circular silhouettes are first filtered into gradient silhouettes, the resulting volume projections of the silhouettes yield gradient cones. In the case where the gradient cones have a Gaussian density cross-section, the product of the gradient cones produces a combined gradient volume having a 3-D isosurface that is, depending upon the circumstances, substantially identical to a sphere. If the filtering applied to the silhouettes produces images with a smooth but non-Gaussian cross-section, the 3-D isosurface will be a smooth surface that is only approximately spherical. The 3-D isosurface is then represented by polygons to any desired degree of accuracy, with the polygons thereby providing the final representation of the original sphere. Similar benefits can occur when representing more complicated objects; combining the gradient cones permits rapid derivation of a smooth model which is consistent with the silhouettes. Such smooth models are much better suited to approximation of their subjects by texture mapping, since they do not have the sharp edges and abrupt corners characteristic of a Boolean combination of a limited number of silhouette cones. Depending upon the complexity of the object and the available amount of processing power, real time imaging of moving or otherwise changing objects may also be achieved.

In accordance with another aspect of the invention, a method for generating a graphical representation of a 3-D object using a single silhouette is provided. The method includes the steps of selecting an imaging point for imaging the object, imaging the object from the selected imaging point to generate an image, extracting a binary silhouette from the image of the object, and filtering the silhouette to generate a gradient silhouette. Then, the gradient silhouette is projected to generate a gradient volume projection that is combined with a pre-determined gradient volume to yield a combined gradient volume. A 3-D isosurface is determined from the combined gradient volume. The 3-D isosurface is representative of the 3-D object as combined with the predetermined gradient volume projection. A polygonal representation of the 3-D surface then may be generated and displayed.

In one example, the silhouette is of a human performer and the pre-determined gradient volume is generally block-shaped. Once the silhouette of the human performer is combined with the block shaped volume, a 3-D approximation of the human shape of the performer is produced. The technique thereby allows 3-D simulation of a human performer using only a single initial silhouette and therefore represents a particularly efficient technique for generating a 3-D representation of the human performer, particularly desirable for real-time 3-D imaging.

Other features and advantages of the invention are provided as well. Apparatus embodiments of the invention are also provided.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF THE PREFERRED EMBODIMENTS

With reference to the figures, exemplary embodiments of the invention will now be described. Initially, the operation of an exemplary embodiment employing multiple silhouettes will be described with reference to FIGS. 1 and 2. Then, various alternatives and applications will be described with references to FIGS. 3–8. Finally, an alternative embodiment employing only a single initial silhouette will be described with reference to FIGS. 9A and 9B.

Figure 1:
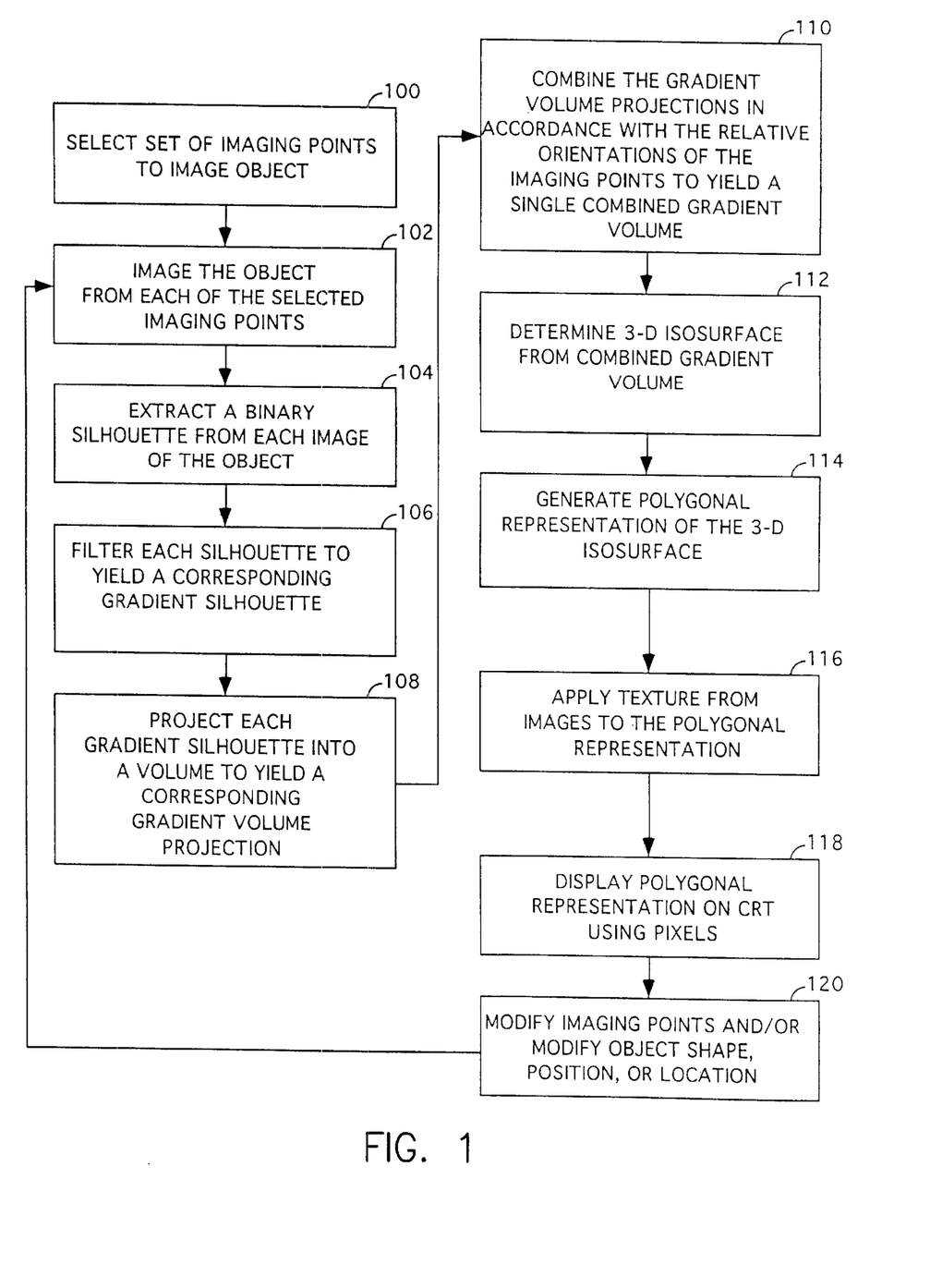
FIG. 1 is a flow chart illustrating an exemplary embodiment of the multiple-silhouette gradient-based projection method of the invention.
Figure 2:
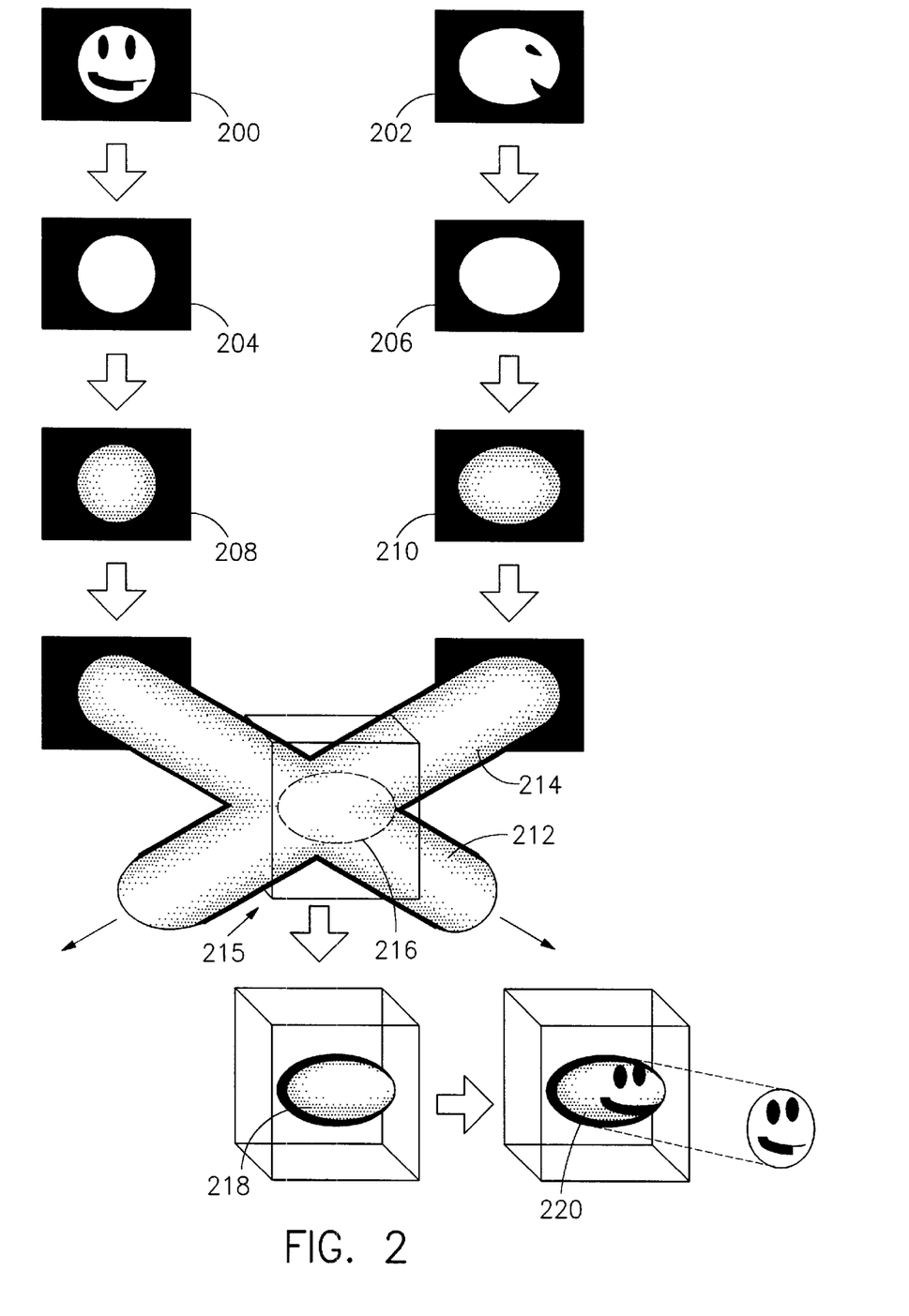
FIG. 2 is a graphic illustration of pertinent steps of the method of FIG. 1.

FIG. 1 illustrates a gradient-based silhouette projection technique for rendering a computer graphic representation of an actual 3-D object. FIG. 2 graphically illustrates a specific rendering example wherein a sample object is imaged. The sample object is a toroid or egg-shaped object having a face imprinted thereon. Initially, at step 100 of FIG. 1, a set of imaging points and orientations are selected for imaging the object. A wide variety of orientations of imaging points may be selected. In some cases only two imaging points are selected. In other cases dozens of imaging points are selected. The total number and relative orientation of the imaging points depends, in part, upon the object being imaged and upon the fidelity with which the object is to be rendered. Various exemplary sets of imaging points are described below with reference to FIGS. 3–6.

At step 102, the object is imaged from each of the selected imaging points to generate a set of 2-D images. A wide variety of imaging devices may be employed. Examples include conventional video cameras and the like that generate 2-D frames representing the object. In other cases, conventional still cameras will be employed to photograph the object. FIG. 2 illustrates two frames 200 and 202 of the sample object with the first frame imaged from an imaging point directly in front of the object and the second frame imaged from an imaging point directly to the side of the object. At steps 104 of FIG. 1, a binary silhouette is extracted from each of the images of the object produced at step 102. If the object was imaged with a video camera, a frame grabber or similar device is employed to extract the binary silhouette from each frame and input a digital representation of the extract silhouette into a computer. If the object was photographed, then the photographs are scanned into the computer then manipulated by the computer to extract a binary silhouette from each of the photographs. In either case, the resulting silhouette is essentially a binary representation of the image. By "binary", it is meant that each point in the silhouette has one of two values, typically either black or white. The binary silhouette, however, need not be represented internally within the computer with only binary bits. Any appropriate digital representation of the two values of the binary silhouette may be employed. To isolate a desired object from its background or environment, the background is initially imaged without the object, and then the object is imaged against the background. Conventional techniques are employed to subtract the common portions of the images to thereby remove the background and leave only the desired object. As can be appreciated, a wide range of techniques may be employed in this regard. Exemplary binary silhouettes 204 and 206 are shown in FIG. 2. As can be seen, the exemplary binary silhouettes do not incorporate any of the surface texture of the initial images. Hence, the face of the object is not included in the silhouette.

At step 106 of FIG. 1, each binary silhouette is filtered to yield a corresponding gradient or continuous silhouette. Whereas the binary silhouettes are strictly binary, with for example the background represented by pure black and the object represented by pure white, the gradient silhouettes are gray scale images having a range of values from pure black to pure white. Exemplary gradient silhouettes 208 and 210 are provided in FIG. 2. In the examples, the gray scale values of the gradient silhouettes vary uniformly with radial distance from the center of the silhouette. Other gradient variations may alternatively be employed.

The binary silhouettes are filtered to produce gradient silhouettes using any of a variety of the filtering techniques. For example a Gaussian filter may be applied to generate a gradient across each binary silhouette. In a particular exemplary embodiment, the binary silhouettes are filtered by calculating the tubular neighborhood in the vicinity of the perimeter of the binary silhouettes. Details regarding one particular technique for calculating the tubular neighborhood of a shape are described in *Constructing Implicit Shape Models From Boundary Data,* by Luiz Velho et al., Computer Vision and Image Processing, Volume 57, No. 3, May 1995, pages 220–234.

After the binary silhouettes are filtered to generate the gradient silhouettes, each of the gradient silhouettes is projected into three dimensions to yield a corresponding gradient volume projection. Because each projected silhouette is a gradient silhouette, the resulting volume projection is a gradient volume projection having a density that varies with radial distance from the core of the projection. A cross section of each volume projection matches the pattern of the corresponding gradient silhouette. Exemplary gradient volume projections 212 and 214 are shown in FIG. 2. In that example, the gradient volume projections are cylinders each with a density that decreases from its core to its perimeter in the same manner that the two dimensional density of the corresponding gradient silhouette decreases from its center to its perimeter. The gradient volume projections may be represented internally within the computer using any suitable volume density representation, such as voxels with each voxel incorporating a value representing the density at the voxel location. One technique for use in projecting silhouettes into three-dimensional volumes using voxels is described in *Generating Octree Models of 3-D Objects from of Their Silhouettes in a Sequence of Images,* by Michael Potmesil, Computer Vision, Graphics, and Image Processing 40, pages 1–29 (1987). Another technique for projecting silhouettes into three-dimensional volumes using voxels is described in *Geometric Clipping Using Boolean Textures,* IEEE Proceedings of Visualization", by William Lorenson, 1993, pages 268–274. Both references are directed to projecting binary silhouettes rather than gradient silhouettes but the techniques described therein may be modified to project gradient silhouettes.

Further with regard to the gradient volume projections, if the imaging point corresponding to the projection was located relatively close to the object, then the gradient volume projection is a cone extending from the imaging point through the gradient silhouette. If, however, the imaging point is relatively far from the object, the imaging point may be effectively regarded as being at infinity, such that no perspective effects occur and the resulting gradient volume projection is therefore a cylinder, rather than a cone.

At step 110, all of the gradient volume projections are combined to yield a single combined gradient volume having, at each three-dimensional location therein, a density value equaling the product of the densities of each of the individual gradient volume projections at that location The combination of gradient volume projections by multiplication is exemplary; other combinations may be useful, including summations and the like. In any case, the individual gradient volume projections are combined in accordance with the relative orientations of the imaging points from which the projections were generated. In FIG. 2, the single combined gradient volume projection produced by the combination of projections 212 and 214 is collectively identified by reference numeral 215.

At step 112, a 3-D isosurface of the combined gradient volume is selected based upon a predetermined volume density value. The isosurface is a contour of substantially uniform density within the combined gradient projection. In one embodiment, the isosurface is computed using a "marching cubes" technique described in *Marching Cubes: A High Resolution 3D Surface Reconstruction Algorithm*, Computer Graphics, Vol. 21, #4, 1987, pp. 163–169 (Proceedings of SIGGRAPH 87). Another reference describing the marching cubes technique is *Introduction to Implicit Surfaces*, edited by Jules Bloomenthal, chapter 4: "Surface Tiling" (pp. 126–165) Morgan-Kaufmann Publishers, Inc. San Francisco, 1997. In FIG. 2, the isosurface is identified by reference numeral 216.

The isosurface corresponds generally to the surface shape of the 3-D object being imaged. The extent to which the isosurface actually corresponds to the surface of the object depends, in part, upon the complexity of the object being imaged and depending on the number and orientation of the imaging points. In this regard, the greater the number of the initial imaging points selected step 100 and the more uniform their distribution around the object, the more closely the isosurface will correspond to the surface of the object. Because gradient silhouettes are employed and gradient volume projections are generated, the 3-D isosurface will much more smoothly represent the object than a corresponding Boolean intersection of a set of the combined binary volume projections. Hence, far fewer initial images may be required to generate a reasonably useful representation of the 3-D object. Thus, processing time is reduced. In some circumstances, overall processing time is reduced by an amount sufficient to permit real-time imaging of the 3-D object.

At step 114, a polygonal representation of the isosurface is generated. In exemplary embodiments, the polygonal representation is generated by employing a technique for approximately determining the set of polygons representing the locus of all lines not intersecting the isosurface. Marching cube techniques may be exploited here as well. In FIG. 2, the resulting polygonal representation of the isosurface is identified by reference numeral 218. (In FIG. 2, the individual polygons of polygonal representation 218 are very small and are therefore not individually shown.) Once the polygonal representation of the isosurface has been generated, textures are added to the polygons, step 116, to further improve the accuracy with which the polygons represent the 3-D object. The textures applied to the polygons may be based upon textures imaged during step 102 or the textures maybe artificial textures, perhaps read from pre-stored texture files. In FIG. 2, the final polygonal representation of the sample object with texture applied thereon is identified by reference numeral 220.

At step 118 of FIG. 1, the polygonal representation of the 3-D isosurface is displayed on a CRT or other suitable computer display device to thereby provide a computer graphic representation of the object imaged at step 102. Conventional pixel rendering techniques may be employed. Because the polygons represent the entire external surface of the 3-D object, the polygons can be viewed on the CRT from any desired orientation. For example, if the object being imaged represents a building, the polygons will represent all sides of the building such that, with suitable operator input, any chosen side of the building then can be viewed, e.g. the front side or the back side. It should be noted that the orientation by which the polygonal representation is viewed on the CRT is not limited by the original choice of imaging points of the object (although some missing details may be evident when viewed from some locations). Any appropriate technique for post-processing the polygonal representation of the surface of the object may be employed, including additional smoothing or filtering techniques. In one specific example, the polygonal representation of the object is "morphed" to yield a differently shaped object.

At step 120, if desired, the imaging points may be modified. If so, execution returns to step 102 wherein the imaging process is repeated using the new set of imaging points. Thus, in one particular example, if the original imaging points were selected to be located close to the object, a new set of imaging points located farther away from the object may instead be used resulting in a slightly different representation of the object. As another example, if the total number of imaging points was found to not provide a suitably accurate representation of the object, then the number of the imaging points may be increased. In other cases, the number of imaging points will be decreased. In still other cases, the number of imaging points will remain the same, but the relative orientation of the imaging points will be changed, perhaps in an attempt to improve the accuracy with which the rendering process approximates the object.

Also at step 120, the object itself may be modified, perhaps to change its shape or position. If the object is modified, execution also returns step 102, where the steps of the method are repeated to generate a polygonal representation of the modified object. Steps 102–120 may be repeated periodically to update the polygonal representation to account for changes in the location or shape of the object. Depending upon the complexity of the object, the number of imaging points selected, and the processing power of the computer or other system performing the steps of the method, the entire method may be performed substantially in real time to permit real time imaging of moving or changing objects.

Figure 3:
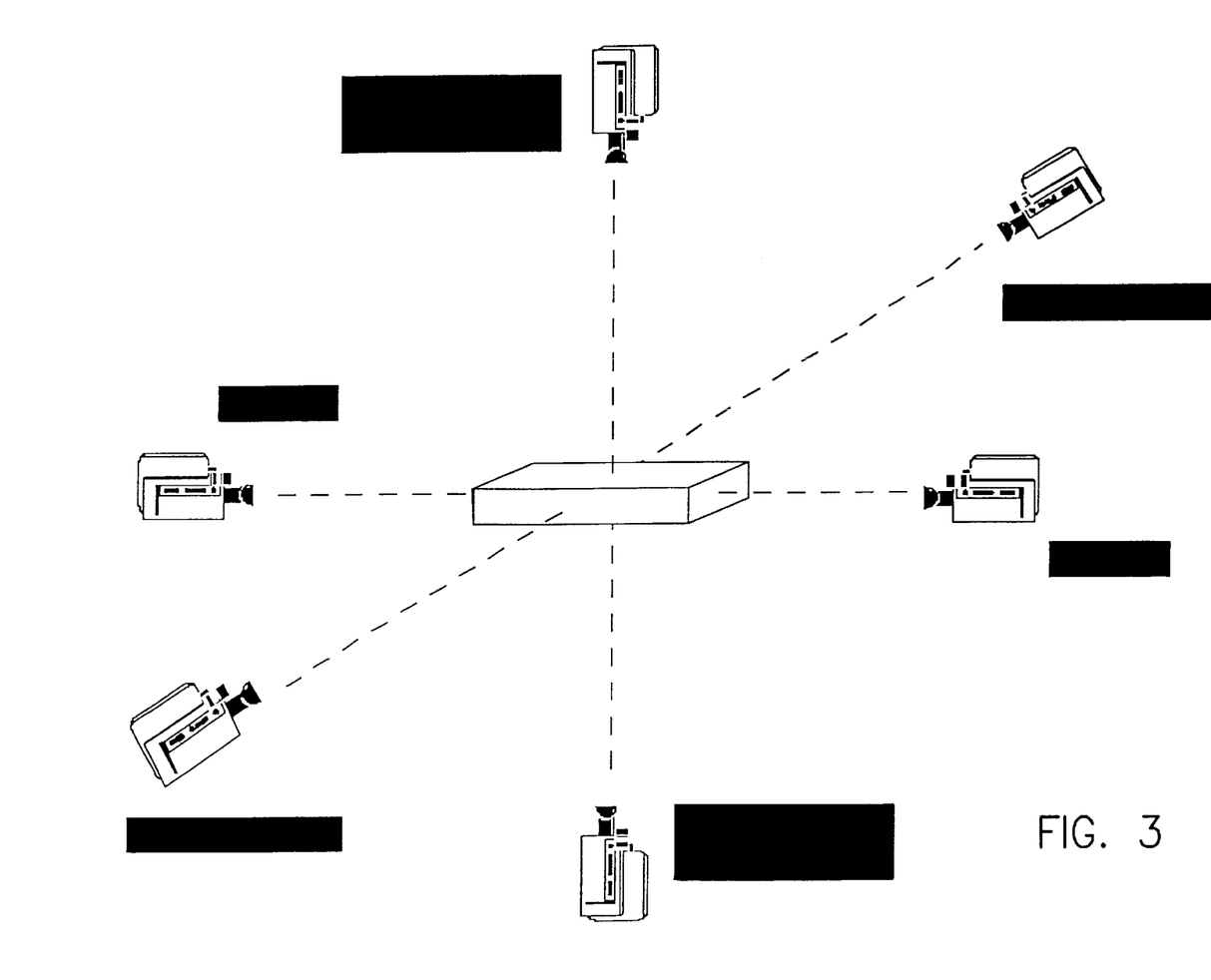
FIG. 3 is a block diagram illustrating a first exemplary orientation of video cameras for use in imaging a 3-D object using the method of FIG. 1 wherein an orthogonal arrangement of six cameras positioned close to the object is employed.
Figure 4:
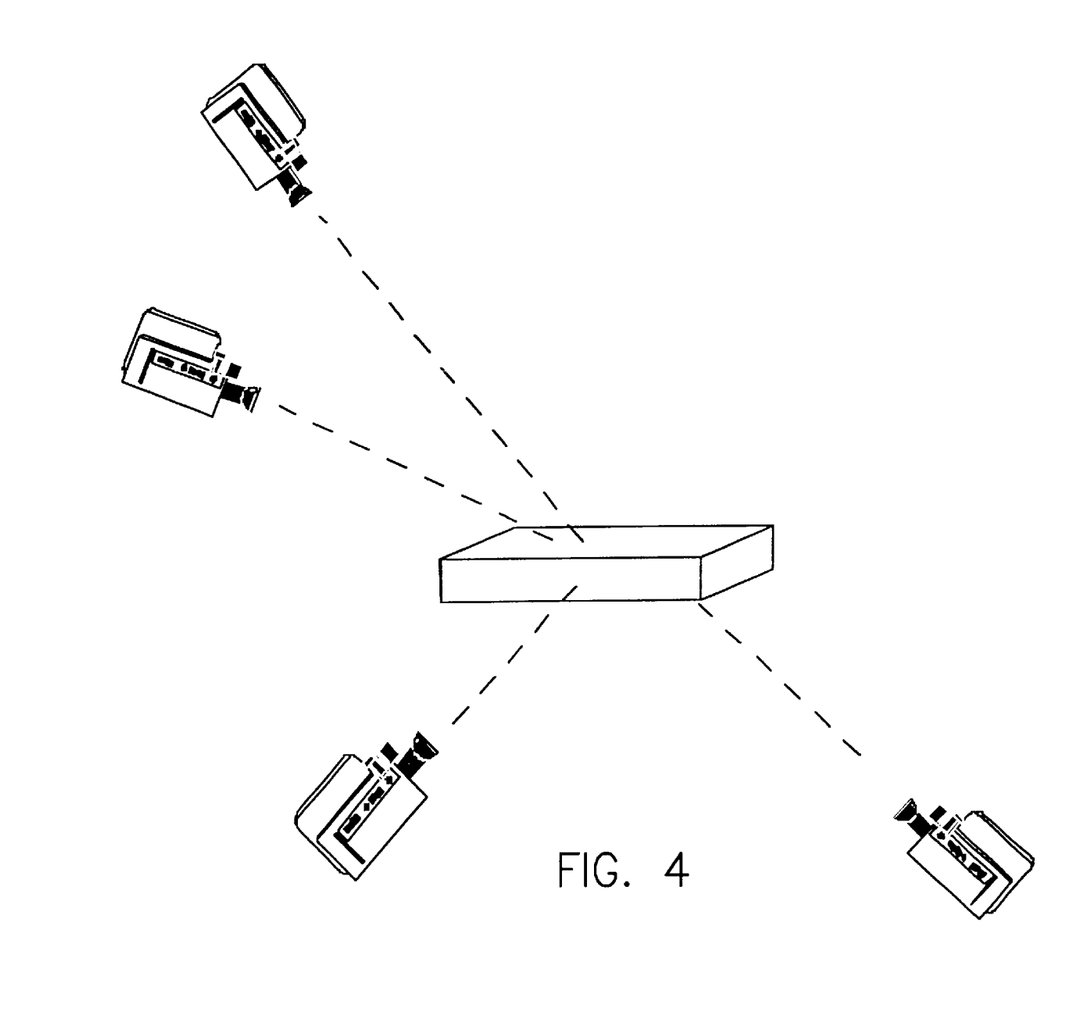
FIG. 4 is a block diagram illustrating a second exemplary orientation of video cameras wherein a non-orthogonal arrangement of four cameras positioned close to the object is employed.
Figure 5:
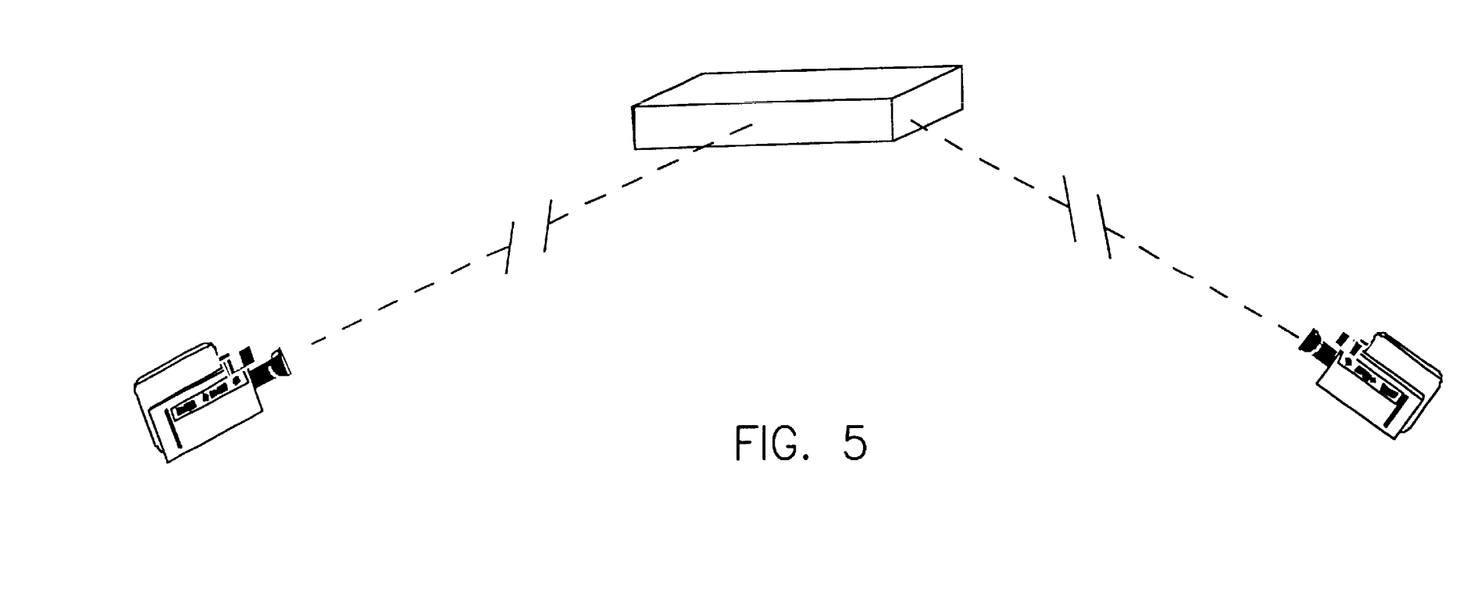
FIG. 5 is a block diagram illustrating a third exemplary orientation of video cameras wherein a non-orthogonal arrangement of two cameras effectively located an infinite distance from the object is employed.
Figure 6:
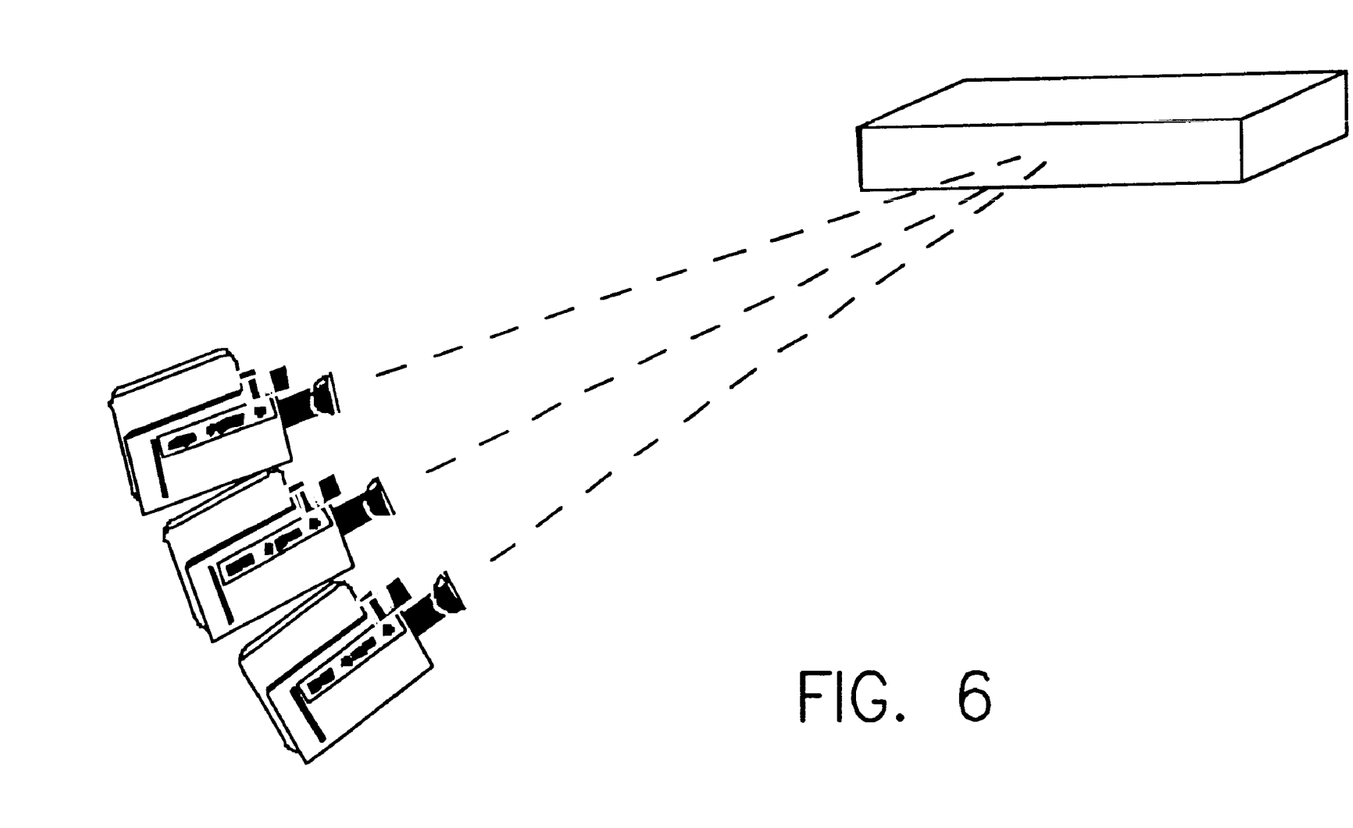
FIG. 6 is a block diagram illustrating a fourth exemplary orientation of video cameras wherein three closely spaced cameras are employed.

As noted above, a wide variety of orientations of the imaging points may be employed. FIGS. 3–6 illustrate various examples wherein an object, specifically a rectangular box, is imaged from orthogonal imaging points. In the example of FIG. 3, the box is imaged from six directions—top, bottom, front, back, left side, and right side—using six video cameras. FIG. 3 also shows the image seen by each video camera from its perspective. FIG. 4 illustrates orientation of four non-orthogonal imaging points. Even though non-orthogonal, the combination of imaging points may nevertheless produce a fairly faithful representation of the object. FIG. 5 provides yet another non-orthogonal orientation. In FIG. 5, a pair of video cameras is oriented with each video camera positioned far enough away from the object to be regarded as being at infinity. Hence, when gradient silhouettes of the imaged object are projected into three-dimensional space, the result will be cylindrical volumes, rather than conic volumes. FIG. 6 illustrates yet another possible orientation of imaging points. Three video cameras are located closely adjacent to one another to provide only slightly differing views of the object. As a result, the polygonal representation of the object will not provide any detail regarding the side or rear portions of the object. However, by imaging the same object from closely adjacent imaging points, some degree of three dimensionality is imparted. Although FIGS. 3–6 each illustrate an arrangement having separate cameras at each imaging point, a single camera may instead be employed with the object repeatedly re-imaged by the single camera and with the object re-oriented with respect to the single camera to generate the various imaging points. The object may be placed on a turntable permitting a single camera to repeatedly image the object as it rotates on the turntable.

Figure 7:
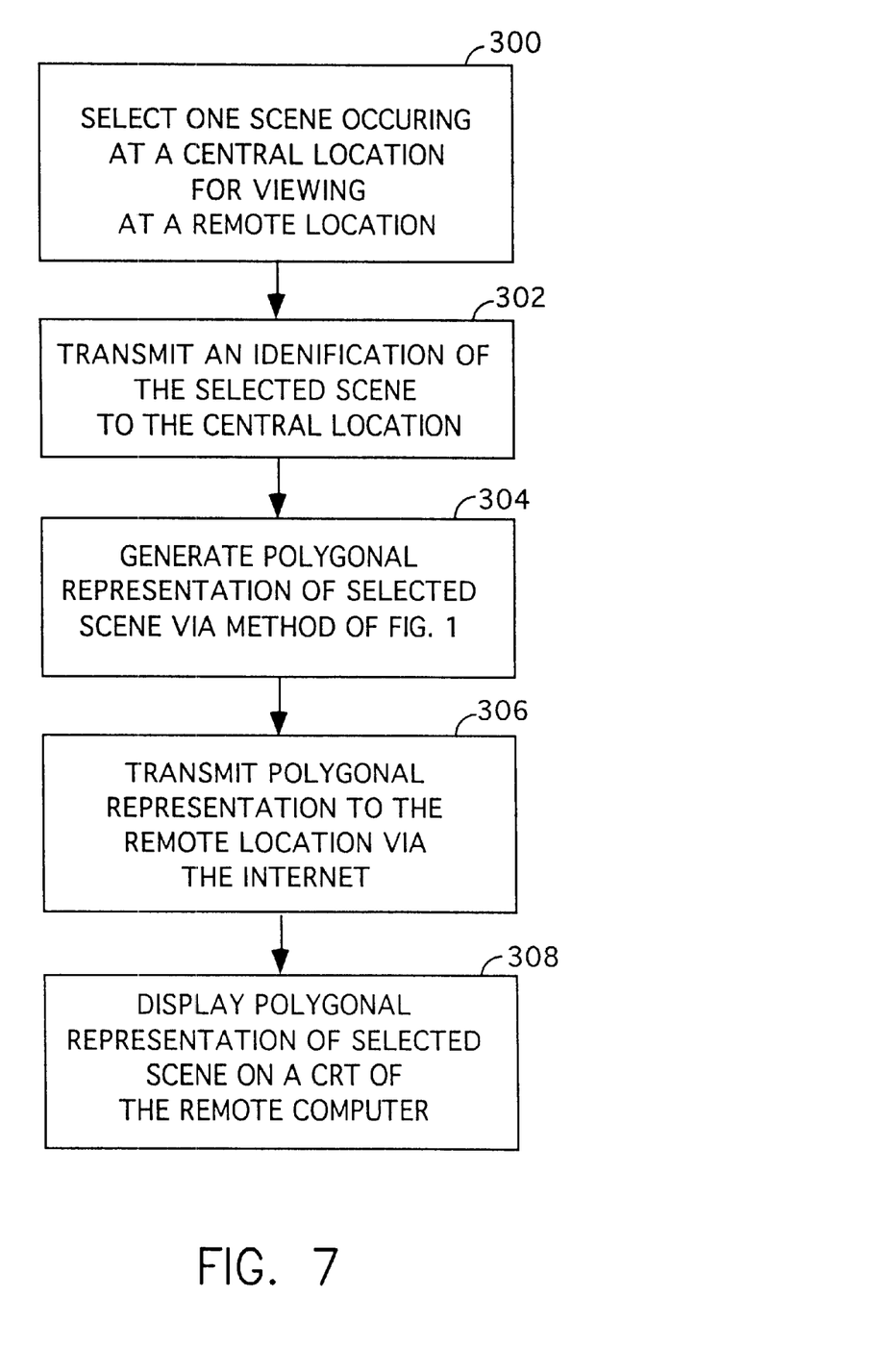
FIG. 7 is a flow chart illustrating a method for applying the gradient-based silhouette projection method of FIG. 1.
Figure 8:
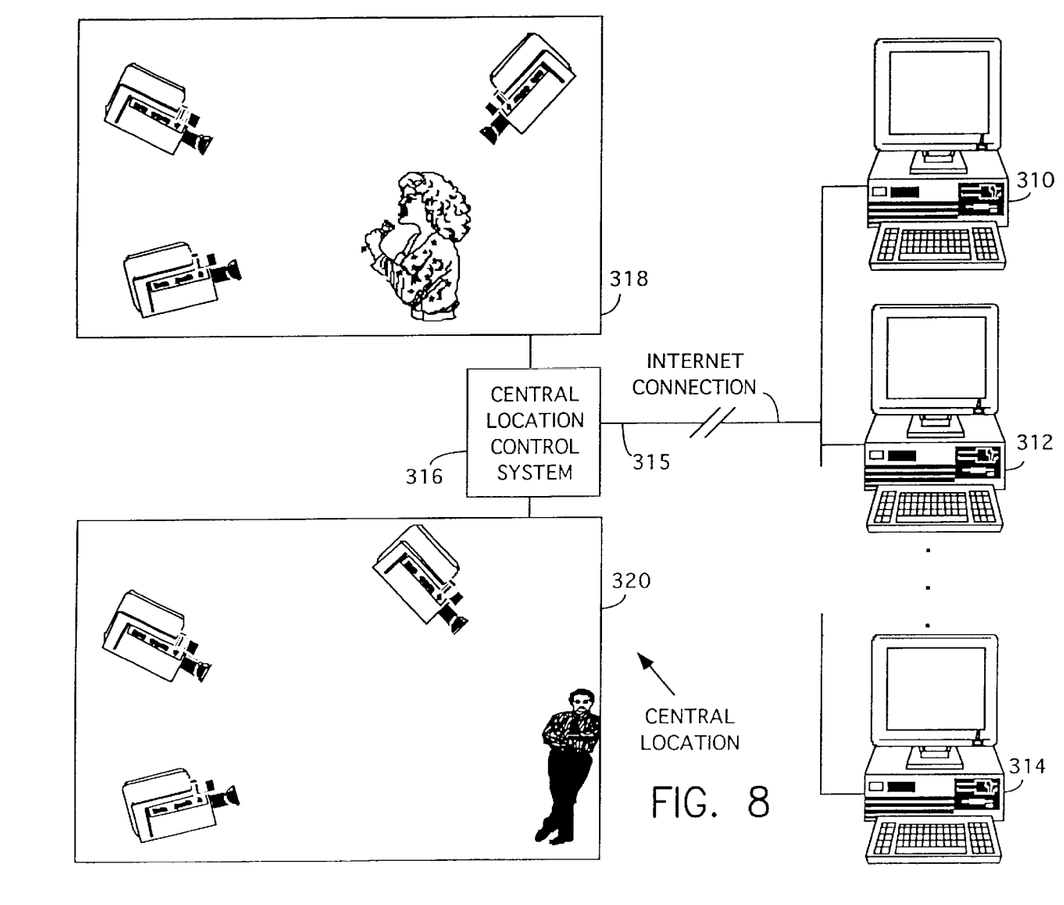
FIG. 8 is system diagram illustrating a system for use in implementing the method of FIG. 7.

FIGS. 7 and 8 illustrate one particular application of the method of FIG. 1 wherein 3-D scenes presented at a central location, such as performances by entertainers, are imaged and converted to polygonal representations, then the polygonal representations are transmitted over the Internet to a variety of remote computers. More than one scene is simultaneously imaged and operators of the remote computers select one particular scene for viewing at their respective remote computer. Referring first to FIG. 7, at step 300, one scene from a predetermined group of a scenes is selected by the operator of a remote computer. At step 302, an identification of the selected scene is sent from the remote computer to the central location through the Internet. At step 304, a polygonal representation of the selected scene is generated using a computer at the central location. The computer employs the method described above with reference to FIG. 1. At step 306, the resulting polygonal representation of the 3-D scene is transmitted to the remote location through the Internet. Finally, at step 308, the scene depicted by the polygonal representation is displayed on a CRT or other computer display device of the remote computer.

FIG. 8 illustrates the overall system which includes a set of remote computers 310, 312 and 314 connected via the Internet 315 to a central location control system 316 which receives images of 3-D scenes presented at location 318 and location 320. With this arrangement, the operators of the remote computers can select between the scene of location 318 and the scene of location 320 then have a polygonal representation of the scene transmitted to his or her computer. Once the polygonal representation is received, the polygonal representation can be viewed from any desired perspective to thereby view the scene from any desired direction. Hence, the operator of remote computer 312 is not limited to viewing the scene merely from one particular viewing point, as is required with conventional television signals, but can view the scene from any desired three-dimensional location relative to the scene. With suitable processing power, real time images of the two scenes can be generated, converted into three-dimensional polygonal representations, then transmitted through the Internet (or other signal transmission means) to the various remote computers for real-time display thereon as 3-D images.

Figure 9A:
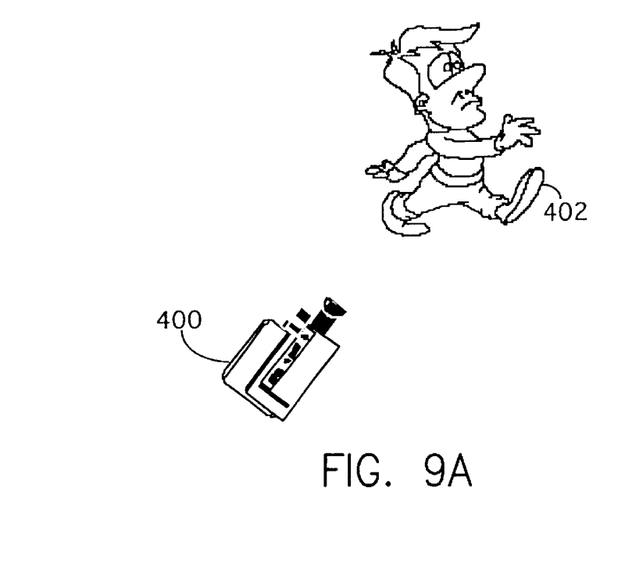
FIGS. 9A and 9B is a graphic illustration of an alternative gradient-based technique of the invention wherein a single silhouette is employed.
Figure 9B:
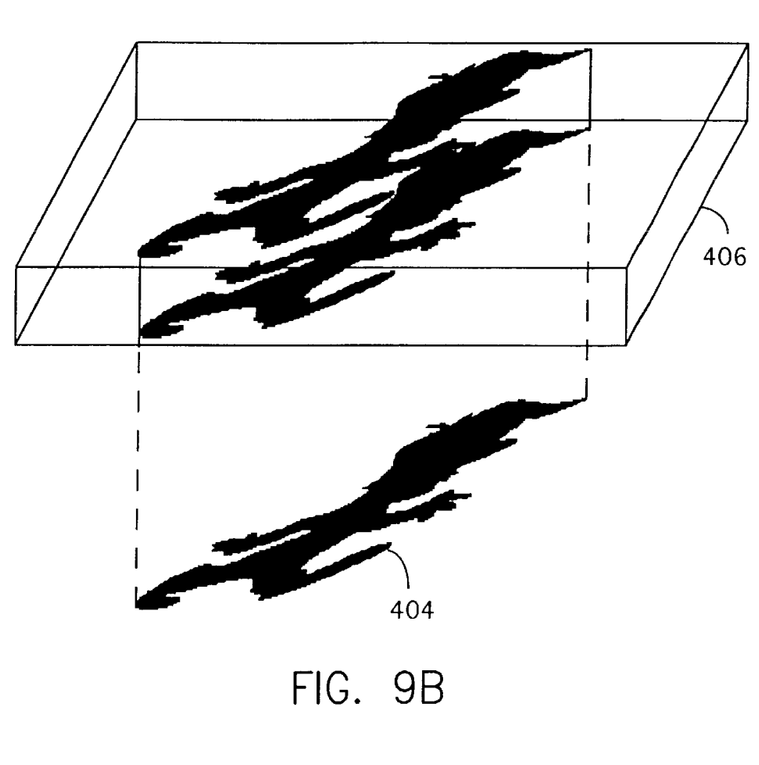

FIGS. 9A and 9B illustrate an alternative technique employing only a single initial silhouette. A single video camera 400 is employed to generate an image of a performer 402 or other object. A binary silhouette of the image is extracted then filtered into a gradient silhouette 404 in the same manner as described above. The gradient silhouette is projected into a volume and combined with a pre-determined or "canonical" gradient volume 406 which, as shown, may be block-shaped. For clarity in illustrating the basic technique, the gradient "blurring" of both the silhouette and block-shaped gradient volume are de-emphasized in the illustrations of FIGS. 9A and 9B. A 3-D isosurface is generated from the combination of the projected gradient volume and the pre-determined gradient volume. A polygonal representation of the 3-D isosurface may then be generated, transmitted and displayed. By projecting the gradient silhouette into a block-shaped gradient volume, three-dimensionality is imparted to the initial 2-D image of the performer or other object without requiring multiple initial images of the performer. Hence, processing time is greatly reduced and, depending upon the particular circumstances, real-time 3-D imaging is more conveniently achieved.

What have been described are various exemplary methods for generating 3-D computer graphic representations of the actual objects or scenes using a gradient-based silhouette projection technique. Various applications of the method have also been described. It should be a understood, however, that the examples described herein merely illustrate aspects of the invention and should not be construed as limiting the scope of the invention which may be implemented in any manner consistent with the general principles of the invention described therein.

I claim:

1. A method for generating an internal computer representation of a 3-D object comprising the steps of:

inputting a plurality of images of the object from each of a set of selected imaging points;

extracting a binary silhouette from each image of the object;

filtering each binary silhouette to generate a plurality of corresponding gradient silhouettes, said gradient silhouettes each being substantially less sharp than the corresponding binary silhouette;

projecting each gradient silhouette to generate a plurality of corresponding gradient volume projections;

combining the plurality of gradient volume projections to yield a combined gradient volume;

determining a 3-D isosurface from the combined gradient volume; and generating an internal representation of the 3-D isosurface within the computer.

2. The method of claim 1 wherein the gradient volume projections are represented by voxels.

3. The method of claim 2 wherein said step of determining a 3-D isosurface from the combined gradient volume is performed by applying a marching cubes algorithm to the voxels representing the combined gradient volume.

4. The method of claim 1 wherein the step of generating an internal computer representation of the 3-D isosurface includes the step of generating a set of polygons representing the 3-D isosurface.

5. The method of claim 4 wherein the step of generating a set of polygons representing the 3-D isosurface is performed to approximately determine the set of polygons representing the locus of all lines which do not intersect the 3D isosurface.

6. The method of claim 4 further including the step of texturing the set of polygons.

7. The method of claim 6 further wherein the texturing of the set of polygons is based upon the plurality of images.

8. The method of claim 7 further wherein the texturing of the set of polygons is based upon additionally provided textures.

9. The method of claim 4 further including the step of displaying a pixel representation of the set of polygons.

10. The method of claim 1 wherein the object is located at a first location and wherein the method further includes the steps of transmitting the internal representation of the 3-D isosurface to a second location for display.

11. The method of claim 1 wherein the object is in motion and wherein the steps of the method are repeatedly performed as the object moves to repeatedly update the resulting internal computer representation.

12. The method of claim 1 wherein the step of inputting a plurality of images of the object comprises the steps of:

selecting a plurality of imaging points for imaging the object;

imaging the object from each of the selected imaging points to generate the plurality of images.

13. The method of claim 12 wherein the plurality of imaging points of the object are selected to provide exclusively non-orthogonal views of the object.

14. The method of claim 13 wherein the plurality of imaging points of the object are selected to provide only slightly different views of the object from one another.

15. The method of claim 12 wherein the plurality of imaging points comprises fewer than three imaging points.

16. The method of claim 12 wherein at least one of the imaging points is located an infinite distance from the object.

17. The method of claim 12 wherein at least one of the imaging points is located a finite distance from the object.

18. The method of claim 17 wherein said step of projecting each of the gradient silhouettes to generate an equal plurality of gradient volume projections is performed by determining a conic projection that extends from the corresponding imaging point of the binary silhouette from which the gradient silhouette was generated through the gradient silhouette.

19. The method of claim 12 wherein at least one of the imaging points of the object is selected to move with respect to the object and wherein the steps of the method are repeatedly performed as the imaging point moves to repeatedly update the resulting internal computer representation.

20. An apparatus for generating an internal computer representation of a 3-D object imaged from a plurality of images of the object comprising:

a silhouette extraction unit for extracting a binary silhouette from each image of the object;

a silhouette filter unit for converting a binary silhouette to a gradient silhouette, with each gradient silhouette being substantially less sharp than the corresponding binary silhouette from which it is derived;

a silhouette projection unit for projecting a gradient silhouette along at least two separate projection axes to generate at least two gradient volume projections;

a combined gradient volume generator unit for combining gradient volume projections to yield a combined gradient volume;

a 3-D isosurface determination unit for generating a 3-D isosurface from a combined gradient volume; and an isosurface representation generation unit for generating an internal computer representation of the 3-D isosurface.

21. An apparatus for generating an internal computer representation of a 3-D object imaged from a plurality of images comprising:

means for extracting a binary silhouette from each image of the object;

means for converting a binary silhouette, to a gradient silhouette with each gradient silhouette being substantially less sharp than the corresponding binary silhouette from which it is derived;

means for projecting a gradient silhouette along at least two separate projection axes to generate at least two gradient volume projections;

means for combining gradient volume projections to yield a combined gradient volume;

means for generating a 3-D isosurface from a combined gradient volume; and means for generating an internal computer representation of the 3-D isosurface.

22. A method for generating an internal computer representation of a 3-D object comprising the steps of:

inputting an image of the object;

extracting a binary silhouette from the image of the object;

filtering the silhouette to generate a gradient silhouette, with each gradient silhouette being substantially less sharp than the corresponding binary silhouette from which it is derived;

projecting the gradient silhouette to generate a gradient volume projection;

combining the gradient volume projection with a pre-determined gradient volume to yield a combined gradient volume;

determining a 3-D isosurface from the combined gradient volume, with the 3-D isosurface being representative of the 3-D object as combined with the predetermined gradient volume projections; and generating an internal representation of the 3-D isosurface within the computer.

23. The method of claim 22 wherein the pre-determined gradient volume is generally block-shaped.

24. The method of claim 22 wherein the step of generating an internal computer representation of the 3-D isosurface includes the step of generating a set of polygons representing the 3-D isosurface.

25. In a method for generating an internal computer representation of a 3-D object by projecting and combining silhouettes of the 3-D object, an improvement comprising filtering the silhouettes to generate gradient silhouettes before projecting and combining the silhouettes.

* * * * *